(12) United States Patent
Satish

(10) Patent No.: US 8,078,909 B1
(45) Date of Patent: Dec. 13, 2011

(54) DETECTING FILE SYSTEM LAYOUT DISCREPANCIES

(75) Inventor: Sourabh Satish, Cupertino, CA (US)

(73) Assignee: Symantec Corporation, Cupertino, CA (US)

( * ) Notice: Subject to any disclaimer, the term of this patent is extended or adjusted under 35 U.S.C. 154(b) by 628 days.

(21) Appl. No.: 12/045,256

(22) Filed: Mar. 10, 2008

(51) Int. Cl.
*G06F 11/00* (2006.01)

(52) U.S. Cl. .......................................... 714/15; 714/49

(58) Field of Classification Search ....................... 714/15
See application file for complete search history.

(56) References Cited

U.S. PATENT DOCUMENTS

| | | | | |
|---|---|---|---|---|
| 5,911,041 | A * | 6/1999 | Schaffer | 714/38.13 |
| 7,447,857 | B2 * | 11/2008 | Lyon | 711/162 |
| 2002/0069363 | A1 * | 6/2002 | Winburn | 713/200 |
| 2002/0166081 | A1 * | 11/2002 | Richardson et al. | 714/33 |
| 2004/0019878 | A1 * | 1/2004 | Kotnur et al. | 717/120 |
| 2005/0044533 | A1 * | 2/2005 | Nesbit et al. | 717/124 |
| 2005/0086231 | A1 * | 4/2005 | Moore | 707/100 |
| 2005/0114411 | A1 * | 5/2005 | Childs et al. | 707/204 |
| 2005/0188272 | A1 * | 8/2005 | Bodorin et al. | 714/38 |
| 2008/0016339 | A1 * | 1/2008 | Shukla | 713/164 |
| 2009/0113151 | A1 * | 4/2009 | Teranishi et al. | 711/162 |
| 2009/0187822 | A1 * | 7/2009 | Abreu et al. | 715/700 |

OTHER PUBLICATIONS

*Availability and Description of the File Checksum Integrity Verifier Utility*, [Online], Jan. 23, 2007, [Retrieved on May 27, 2008], 6 pages, retrieved from the URL:< http://support.microsoft.com/kb/841290>.

* cited by examiner

*Primary Examiner* — Scott Baderman
*Assistant Examiner* — Kamini Patel
(74) *Attorney, Agent, or Firm* — Fenwick & West LLP

(57) ABSTRACT

A template is received, the template comprising information describing an expected file system state. A discrepancy detection module compares an expected file system state from the template with an actual or requested state of the file system of a computer. If discrepancies between the expected state and the actual or requested file system state are detected, then an action is performed to respond to the discrepancy.

20 Claims, 4 Drawing Sheets

DETECTING FILE SYSTEM LAYOUT DISCREPANCIES

BACKGROUND OF THE INVENTION

1. Field of the Invention

This invention pertains in general to computer security and administration and in particular to detection of anomalous system conditions through analysis of a computer file system.

2. Description of the Related Art

Modern computer systems are often susceptible to a number of different problems, problems which are exacerbated by the increasing complexity of computer systems. One such problem relates to system security. There exists a wide variety of security threats posed by malicious software—collectively referred to as "malware"—that secretly performs operations not desired by the computer user. Such operations include theft of important data (e.g. financial records), modification or destruction of system or user files, execution of "backdoor" programs, and the like. Unfortunately, malware proves difficult to detect. The increased incidence of polymorphic viruses and other malware has made it increasingly difficult to detect such malware using existing signature-based detection systems.

Another problem of modern computer systems relates to system administration. Even absent malicious intent, applications—such as installers or system tools—may erroneously misplace data or system components, leading to incorrect functioning of the applications/components involved. Given the size and complexity of the file hierarchies associated with modern applications, however, as well as the sheer volume of different applications available, system administrators and other users lack the knowledge to detect such misconfigurations.

BRIEF SUMMARY

The difficulties described above are addressed by a computer, method, and computer program product that apply information—known as templates—about known file hierarchies in order to determine anomalous conditions signaling potential security risks or system misconfigurations.

A computer adapted to prevent execution of malicious code in a software application, comprises a computer readable storage medium storing executable computer program modules. The computer program modules comprise a template storage module for storing a template, the template describing an expected file system state of the computer, the expected file system state determined based on software units installed on the computer. The modules further comprise a discrepancy detection module configured to detect a discrepancy between the expected file system state described in the template and an actual file system state of the computer. The modules further comprise a discrepancy response module configured to perform an action in response to detection of the discrepancy.

One embodiment of the method receives a template describing an expected file system state of the computer, the expected file system state determined based on a set of software units installed on the computer. The method detects a discrepancy, wherein the discrepancy is detected based on a comparison of the expected file system state described in the template and an actual file system state of the computer. The method further performs an action responsive to detection of the discrepancy.

Embodiments of the computer program product have a computer-readable storage medium storing executable computer program modules for responding to discrepancies in a file system of a computer, the modules comprising a template storage module for storing a template, the template describing an expected file system state of the computer, the expected file system state determined based on software units installed on the computer. The modules further comprise a discrepancy detection module configured to detect a discrepancy between the expected file system state described in the template and an actual file system state of the computer. The modules further comprise a discrepancy response module configured to perform an action in response to detection of the discrepancy.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
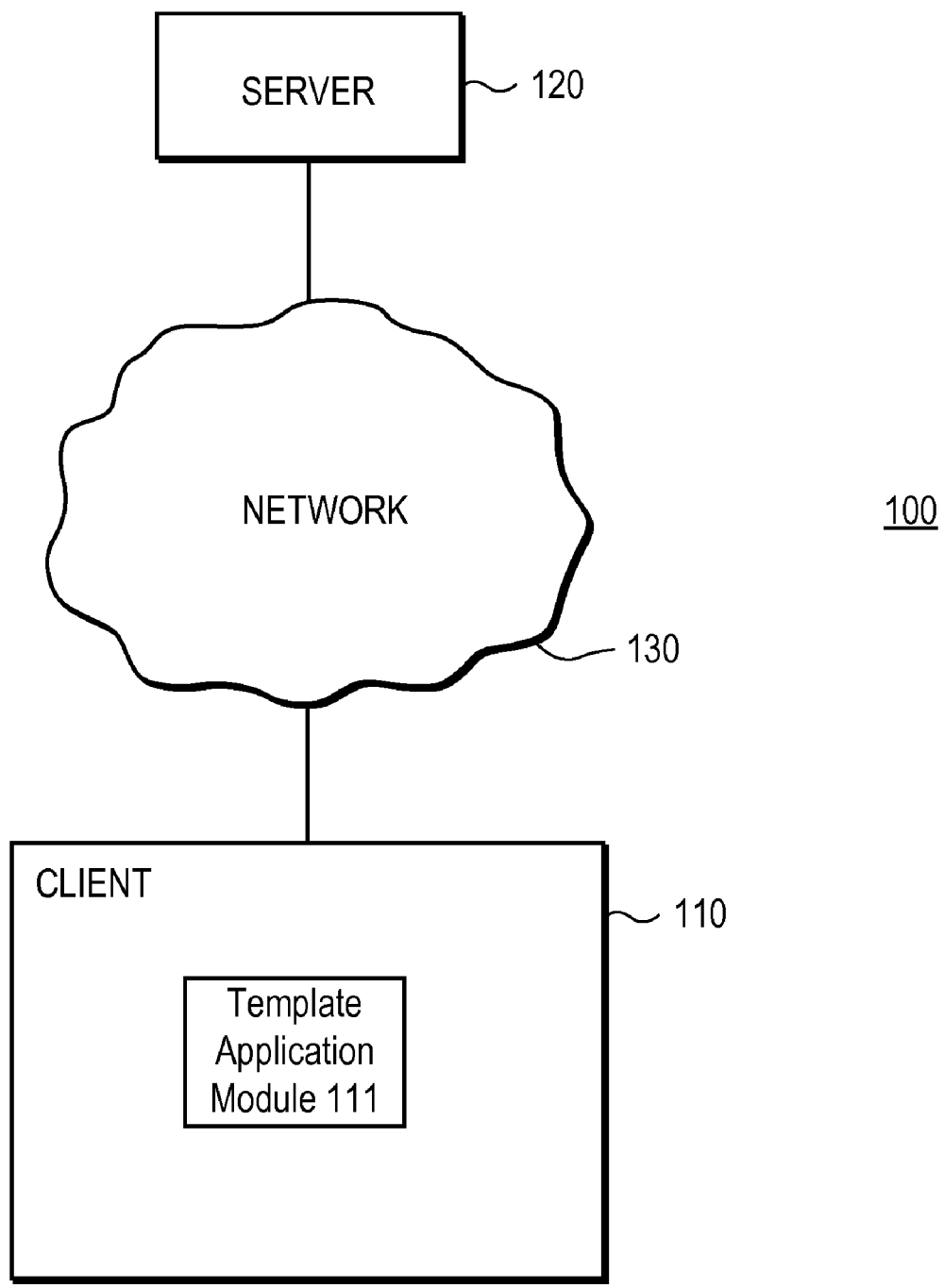
FIG. 1 is a high-level block diagram of a computing environment according to one embodiment.

FIG. 1 is a high-level block diagram of a computing environment 100 according to one embodiment. FIG. 1 illustrates a client 110 and a server 120 connected by a network 130. Only one client 110 and one server 120 are shown in FIG. 1 in order to simplify and clarify the description. Embodiments of the computing environment 100 can have thousands or millions of servers 120 and clients 110 connected to the network 130.

The client 110 can execute a variety of software applications, such as a web browser, email program, word processor, spreadsheet, image viewer, or music player. As mentioned above, some of these applications may be malware, containing malicious code that secretly performs undesirable actions, such as modifying system files or copying personal financial data. Additionally, such applications may have been erroneously installed, for example, so as to function incorrectly or at least sub-optimally.

A template application module 111 executing on the client 110 receives a template describing the expected state of the file system of the client 110. Subsequently, the template application module 111 compares the expected file system state described by the template to the actual file system state of client 110. In response to this comparison detecting anomalous conditions (i.e. discrepancies wherein files in the actual file system do not match those of the expected file system), the template application module 111 may take a variety of actions, including issuing an alert, initiating a security scan for malware, lowering the security permissions of an application associated with the anomalous condition, and the like.

In some embodiments, a server 120 may provide template information to the template application module 111. In such embodiments, the server 120 provides the information to the client 110 via the network 130. The network 130 represents the communication pathways between the server 120 and client 110. In one embodiment, the network 130 is the Internet. The network 130 can also utilize dedicated or private communications links that are not necessarily part of the Internet. In one embodiment, the network 130 uses standard communications technologies and/or protocols such as Ethernet, 802.11, etc. Similarly, the networking protocols used on the network 130 can include the transmission control protocol/Internet protocol (TCP/IP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
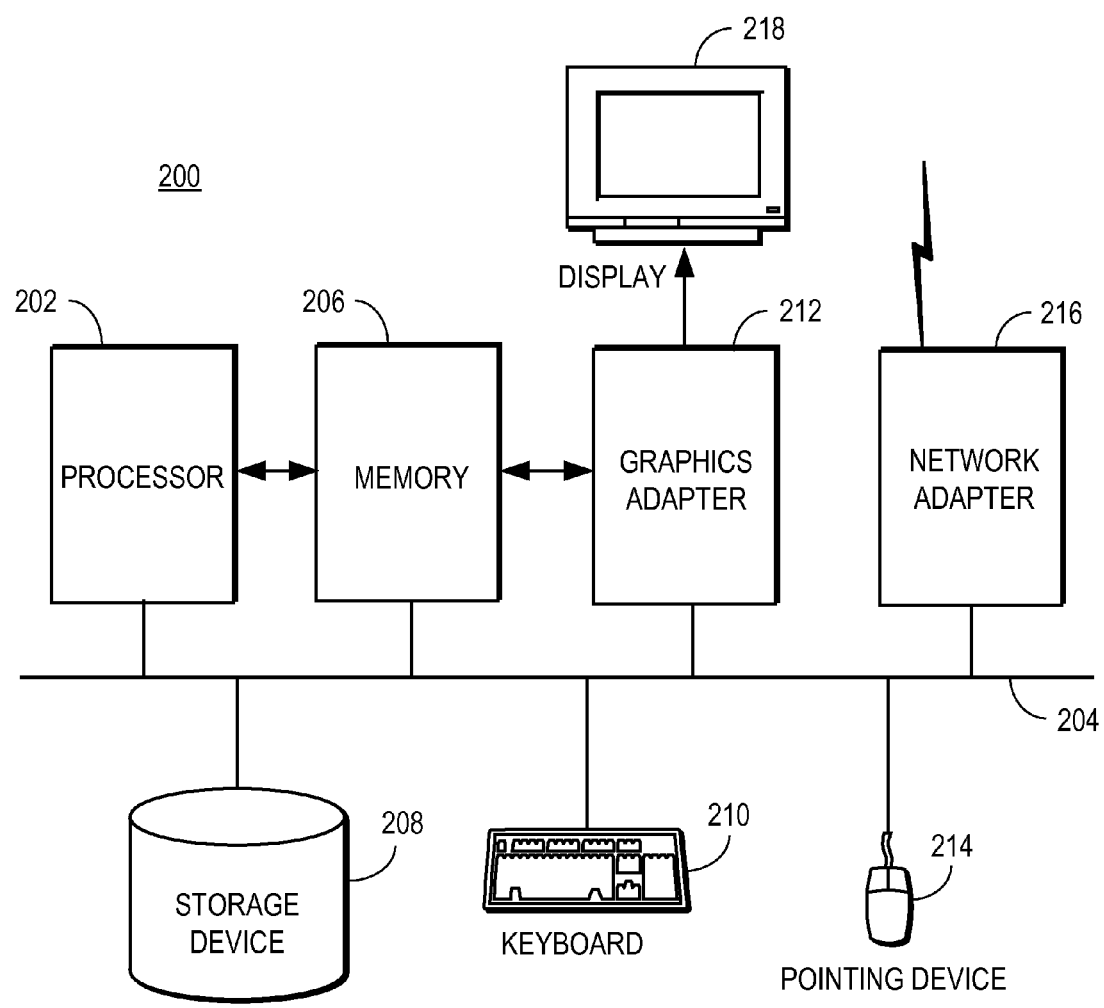
FIG. 2 is a high-level block diagram illustrating a typical computer for use as a server or client according to one embodiment.

FIG. 2 is a high-level block diagram illustrating a typical computer 200 for use as a client 110 or server 120 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 130.

The storage device 208 is, in one embodiment, a hard disk drive but can also be any other device capable of storing data, such as a writeable compact disk (CD) or DVD, or a solid-state memory device. The storage device 208 stores the files for the operating system, applications, operating system packs and patches, and other software units. Files are stored on the storage device 208 according to the file system. A file system typically permits the arrangement of files in a hierarchy, with various directories descending from a file system root. Each file is identified by a file name combined with a file path (together referred to hereinafter as a file identifier). For example, a computer system running the MICROSOFT WINDOWS operating system might use either or both of the New Technology File System (NTFS) or the FAT32 file systems. On such a computer system, the root of a hard disk identified by the operating system by the drive letter "C:" would be designated by the directory path "C:\", and key operating system files might be found at directory paths "C:\Windows\" and "C:\Windows\system32\". A file named "lss.exe" that is expected to be found within directory C:\Windows\system32\ has a file identifier of C:\Windows\system32\lss.exe, for example.

The types of computers 200 utilized by the entities of FIG. 1 can vary depending upon the embodiment and the processing power utilized by the entity. For example, a client 110 that is a mobile telephone typically has limited processing power, a small display 218, and might lack a pointing device 214. The server 120, in contrast, may comprise multiple blade servers working together.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

In addition, this description uses the term "application" to refer to a program executed by the computer 200. The application is formed of one or more files that typically reside on the storage device 208 and are loaded into memory 206 when executed. At least one of the files loaded into memory 206 is referred to as the "executable image" and is executed as a process.

Figure 3:
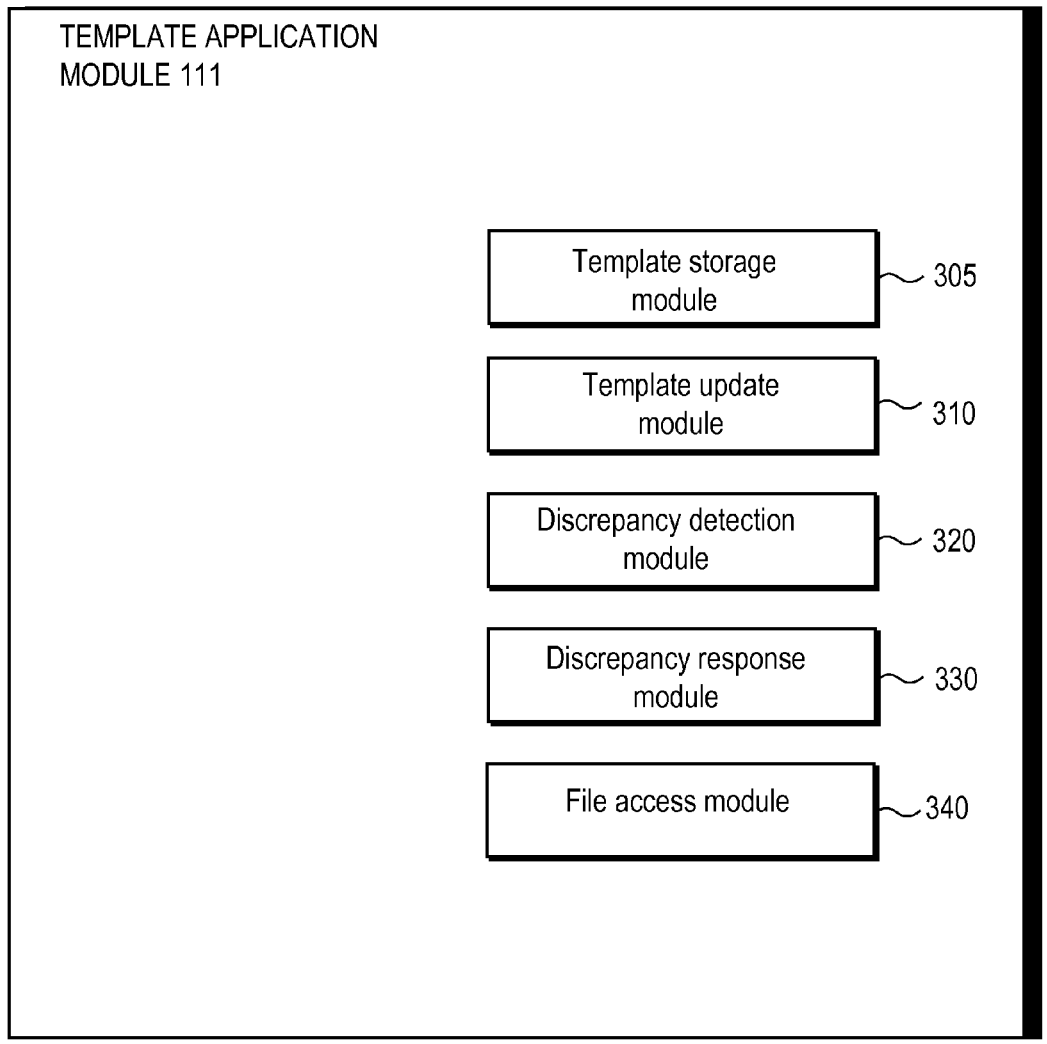
FIG. 3 is a high-level block diagram illustrating a detailed view of a template application module according to one embodiment.

FIG. 3 is a high-level block diagram illustrating a detailed view of the template application module 111 of FIG. 1 according to one embodiment.

A template storage module 305 stores a template containing information describing an expected file system state of a client 110. The expected file system state described in the template may correspond to the entire file system, or it may correspond to a portion or portions thereof, as needed for the purpose for which the template is to be used. One such purpose might be security monitoring, and for such a purpose the template could describe the portions of the file system corresponding to operating system files that are likely to be affected by malware. Another such purpose might be detecting application misconfigurations for a given application, and for this purpose the template could describe the portion of the file system corresponding to the given application. Note that the template storage module 305 may store multiple templates, e.g. one for security monitoring of operating system files, and one for detecting misconfigurations in a particular application. The template stored by the template storage module 305 may be distributed as part of the template application module 111. Alternatively or additionally, it may be obtained subsequently, e.g. by downloading from the server 120, either to obtain an initial template or to obtain a modified template reflecting software units subsequently installed.

The expected file system state described by the template may include a state corresponding to a base version of the operating system, as supplemented by, for example, whatever modifications to the base state of the operating system (e.g. service packs or patches) may have been installed on the client 110. In one embodiment, the template contains a set of filenames and file paths representing the files expected to be within the relevant portion of the file system. For example, if the client 110 is a machine whose operating system is WINDOWS XP PROFESSIONAL, Version 2002, with Service Pack 2 installed, and the portion of the file system deemed relevant includes the "C:\Windows\system32\" directory, the appropriate template for such a system might include entries indicating that the C:\Windows\system32\ directory should contain the files "lss.exe", "svchost.exe", and "winsock.dll." In another embodiment, entries of the template not only contain the file identifier (i.e. name/path) of an expected file, but also a signature of a valid copy of such file, such as an MD5 or SHA1 hash value based on the contents of the file. As discussed later, such signatures provide additional security when detecting the presence of malware. In one embodiment, the template is generated using a conventional tool, such as the File Checksum Integrity Verifier provided by the Microsoft Corporation. Further, in some embodiments template includes all files that should be in the relevant directories, whereas in other embodiments it includes only a subset of those files, such as those having a given file type.

In some embodiments, the template is created by examining the files within the relevant portion of a clean installation of the file system. More specifically, the file system upon which the template is based is not that of the actual client 110 for which the template is destined, but that of, for example, a test computer system administered by a template provider, such as the provider of software embodying the template application module 111. In the case of a template used to analyze security of operating system files, the operating system is freshly installed and the template is created based on the file system state directly after the installation. As another example, for a template used to detect application misconfigurations, the application in question is freshly installed, and the portion of the file system modified by the application installation is examined when creating the template. As further discussed below, such file system information may be represented as change sets with respect to a base file system state, and combined with a template for such base file system state to generate the final template.

The template may be implemented in a number of ways. For example, it may be implemented as a physical single file, or as a number of separate files representing different portions of the relevant portion of the file system. Similarly, the format may be primarily textual, such as XML, or binary. Those of skill in the art would appreciate that implementation of the template is not limited to these possibilities, but may be accomplished in a great number of alternate manners.

A template update module 310 ensures that the template accurately reflects the current expected state of the system. The expected state of the system may change, for example, in response to the installation of an additional service pack for an operating system that adds new operating system files or modifies existing ones, the installation of an application, or the addition of components to an application. In one embodiment, the template update module 310 notes that such an update has taken place, e.g. through registration with, and subsequent notification by, a management framework such as Windows Management Instrumentation, and in response obtains in real time an updated version of template corresponding to the update. In other embodiments, the template update module 310 obtains an update at the time that the software embodying the template application module 111 is run, or at default or user-specified time intervals. In such embodiments, the template update module 310 could access a management interface of the operating system to determine which software units were installed since the last update and then obtain an update that reflect such new software units. In one embodiment, the template update module 310 obtains the updated templates from an update service running on the server 120, e.g. via a request specifying the software units not already reflected in the present template.

Note that each client 110 may have a different configuration, such as a different operating system, different applications and operating system service packs, and the like. Consequently, in some embodiments the template is provided in the form of a base template and a set of template change sets ("deltas") that specify only the differences from the file system state corresponding to the base template. Such a design makes it possible to assemble a template specific to a particular client 110 by combining a base template corresponding to the operating system of the client 110 and a set of deltas, each delta corresponding to a discrete software unit that has been added to the client 110. As a simple example, if a hypothetical service pack for a WINDOWS XP 2002 system is designed to result in the installation of 50 new files in directory "C:\Windows\", then the service pack could be described by a delta enumerating the 50 new files, but not any of the pre-existing files. Similarly, if installation of a different service pack resulted in deletion of an operating system file, a corresponding entry in the delta could note that the file was deleted. In the case of a file modification, a corresponding entry could note the existence of the same file identifier but with a different corresponding signature. In the case of a file being moved, a first corresponding entry could note that the file was deleted, and a second corresponding entry could note that the same file was added to a different location. One of skill in the relevant art would appreciate that such examples are non-exhaustive, and that deltas could be implemented in a wide variety of different manners.

Additionally, entries of the template or delta may be designated as conditional upon a given condition or conditions. Such a technique addresses situations in which a given file is added (or modified, deleted, etc.) only contingent upon a given condition, such as the presence or absence of other software units. For example, if a service pack A installs file X only if service pack B is not already installed, then the entry for file X in a delta for service pack A could be designated as conditional upon the absence of service pack B.

Such deltas may be created by, for example, creating the base template for a particular client, installing the software unit to which the delta corresponds, and creating a second template according to the same procedure. Subsequently, the base template and the second template are compared and the delta assembled based on the observed differences. Other methods for creating a delta, such as real-time monitoring of file system changes at the time that the software unit is installed, e.g. via the use of a file system filter driver, can also be employed.

Note that the above-described technique may also be extended to accommodate "trees" of deltas, wherein a particular software unit may be installed only if another software unit is already installed. In such a case, a "child" delta is generated with reference to a "parent" delta rather than with reference to the base template.

Once the template update module 310 has received the updated template or a delta, it provides it to the template storage module 305. Where the update involves a delta, the template update module 310 may first combine (overlay) the existing template with the delta, e.g. by adding or deleting entries as specified by the delta, before providing the combined template to the template storage module 305. Alternatively, the template update module 310 may provide the template storage module 305 with the delta, uncombined with the prior template which the delta modifies, and the template update module 310 may store the prior template and the delta separately.

The template application module 111 further comprises a file access module 340 that provides to other modules the identities of files that should be checked against the template. When it is desired to perform a complete check of all currently existing files described by the template, the file access module 340 enumerates all files in the relevant portion of the file system. Alternatively, when it is desired to monitor individual files in real time as they are being accessed (e.g. in response to an attempt to create a file in a given directory), the file access module 340 reports the identity of such files at the time that they are accessed. To accomplish such real time monitoring, in one embodiment the file access module 340 is implemented as a file system filter driver that registers with the operating system to be notified of file-related events.

The template application module 111 further comprises a discrepancy detection module 320 which applies the template to the client 110 to determine whether there are file system discrepancies—that is, whether the file system is not in the expected state as specified by the template. This involves comparing files on the actual file system of the client 110 to those expected files specified by the template. In one embodiment, discrepancies are detected purely with reference to the file identifiers (file name/path) of the files stored in the file system and described in the template—that is, files are compared based only on their file identifiers, without reference to their actual content. In another embodiment, the content of the files is additionally examined through use of the file signatures.

Possible discrepancies include missing, modified, or added files, and may have a variety of different causes. For example, a modified file may be the result of a virus or other malware. A missing file might similarly be the result of malware, a hardware fault, or an error in an installer program. The determination of whether or not a discrepancy is present, as well as the specific nature of the discrepancy, may be determined with reference to a single entry in the template (e.g. an entry for a filename that should be present, but is not); alternatively, it may be determined with reference to a combination of multiple entries. As an example of the latter, the presence of a modified file (e.g. a file with the same file identifier, but a different signature) may be determined to constitute a much more serious discrepancy if, in addition, a file having the same name and signature is found in another directory, thus suggesting that malware has moved the true file to another location and substituted a malicious version.

The discrepancy detection module 320 may check for discrepancies among some or all of the files to which the template applies, and to do so is informed of the identities of relevant files by the file access module 340. As noted above, the discrepancy detection module 320 could perform a complete check of all files described by the template. For example, it could check for discrepancies associated with path C:\Windows\, such as deleted or modified files. Such a complete check could be performed at various times, such as at time of system startup, periodically according to a default or a user-specified schedule, upon a user making an explicit request, or upon detection of malware or some other specified condition. Or, it could examine only those files associated with a current event, rather than examining all files after they have already been created and/or modified. For example, the template application module 111 might monitor files being installed to determine whether to allow the installation to proceed.

The template application module 300 further comprises a discrepancy response module 330 which takes an appropriate action in response to a detected discrepancy. The particular action taken may vary, as appropriate for the type of discrepancy, the type of the client 110 (e.g. single-user system), the purpose for which the template is being applied (e.g. detect security breach, detect application misconfiguration), and the like. In one embodiment, the particular action taken is specified by a policy, such as a user-adjustable option setting in software embodying the template application module 111, or a configuration file specified by a system administrator and applicable to all computer systems within a given domain.

One possible action in response to determining that a file is associated with a discrepancy is to initiate a scan of the file by security software to determine whether the file (e.g. one having unexpected modifications) contains a known virus or other type of malware. Such an action could comprise, for example, causing security software such as NORTON ANTIVIRUS to determine whether the file contains the signature of malware that is known to the security software, e.g. stored within a security software database. If it does, then the security software could take additional steps customary to it, such as notifying a user that it detected and quarantined a virus in the anomalous file. If the malware cannot be remediated, then the discrepancy response module 330 could instruct the security software not to permit the file to be executed, restart the client 110 in a "safe mode" for the operating system in question, and then perform a more aggressive scan/repair.

Even if a security scan on a file associated with a discrepancy detects no known malware, the file might in fact still contain malicious code. In such a case, the discrepancy response module 330 could identify an application associated with the file discrepancy and reduce the permissions accorded to the identified application, such as its rights to access the network or to read or alter files on the file system, even if it does not otherwise treat it as malware. Such an action permits code not positively known to be malware to continue to operate, while limiting its ability to do harm. It could also cause the client 110 to restart in a safe mode, as discussed above, in order to prevent malware from interfering with the detection routines of security software.

Another possible action for use in a real-time monitoring context is to block the file access that is attempting to introduce the discrepancy. For example, if a process is attempting to modify a file described by the template, then the discrepancy response module 330 could suppress the modification request. Alternatively, it could allow the modification, but take additional steps to mitigate any possible harm that might ensue, such as marking the file as one to be monitored closely by security software in future.

Another possible action is to issue an alert. Alerts may be appropriate, for example, where the client 110 is a personal computer system used only by a single user. The alert could be issued via a dialog box to a user with administrative rights, noting the discrepancy and providing a choice of possible responses. For example, such a dialog box could contain an explanatory message (e.g. "File C:\Windows\system32\lss.exe appears to have been modified. An unmodified copy of 'lss.exe' has been located in directory C:\Windows\"). Such an alert could further be accompanied by options (e.g. "Block C:\Windows\system32\lss.exe", "Block, and replace C:\Windows\system32\lss.exe with C:\Windows\lss.exe", "Allow C:\Windows\system32\lss.exe to continue with full privileges (not recommended)"). In the case of multiple detected discrepancies, rather than obliging a user to view an alert for every file, one alert can be issued that is applicable to all the discrepancies, or to all the discrepancies of a given type. In the above example, for instance, if many modified files are detected, then the action selected from the above "Block", "Block, and replace", and "Allow" options could be applied to all the modified files.

Note that not all discrepancies necessarily merit an action taken in response. In one embodiment, the discrepancy detection module 320 takes into account a digital signature, such as that on the file and issuer, when determining whether or not to act based on a given file access discrepancy. For example, the presence of trusted signatures could mean that no action will be taken in response to a discrepancy.

Figure 4:
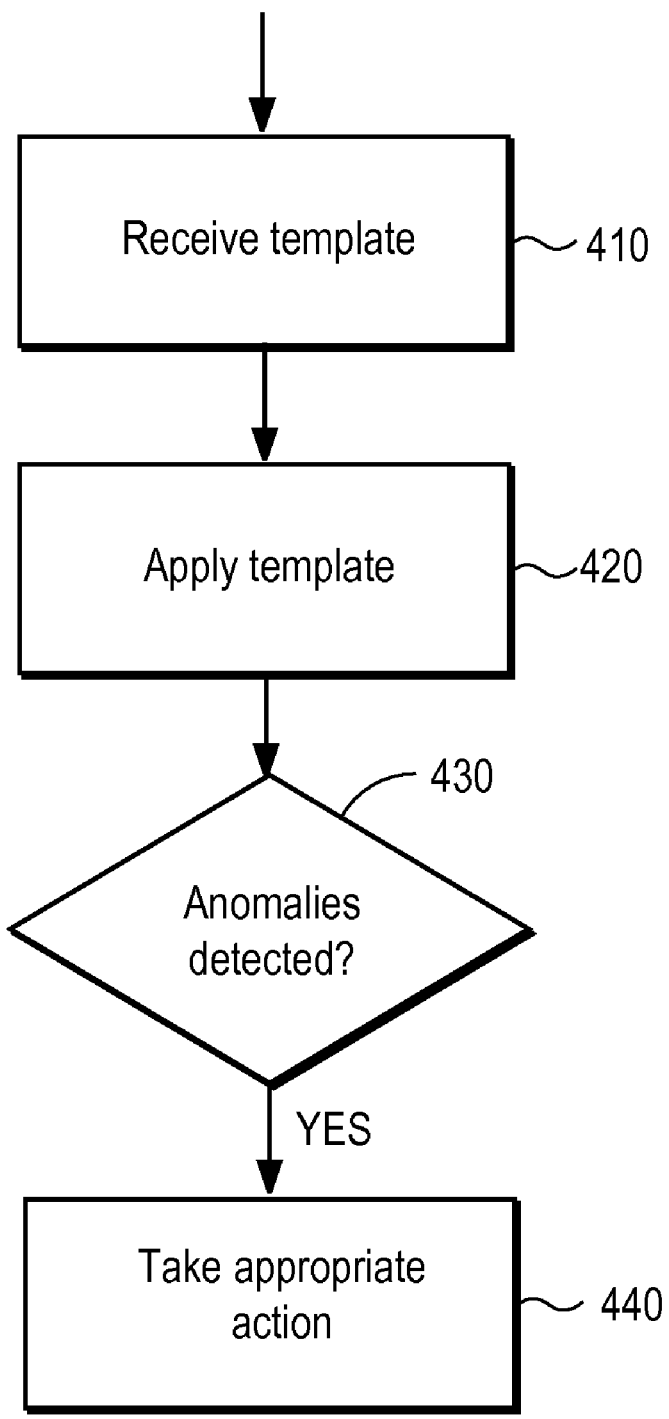
FIG. 4 is a flowchart illustrating steps for using the template application module to detect and respond to system discrepancies, according to one embodiment.

FIG. 4 is a flowchart illustrating steps for using the template application module 111 to detect and respond to file system discrepancies, according to one embodiment. At step 410, the template application module 111 receives the template. This could merely involve reading the current version of the template from local storage, or it could involve updating the template as discussed above, e.g. by downloading an update from a server, in response to the installation of a new service pack, a new application, or other software unit.

The template application module 111 applies 420 the template to the file system of the relevant computer system, as described above with respect to the discrepancy detection module 320. If no discrepancies are detected, then the template application module 111 need take no further action. If, however, one or more discrepancies are detected, then the template application module 111 takes 440 the appropriate action, as discussed above with respect to the discrepancy response module 330.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer adapted to respond to discrepancies in the file system of the computer, comprising:
   a non-transitory computer-readable storage medium storing executable computer program modules comprising:
      a template storage module for storing a template, the template describing an expected file system state of the computer, the expected file system state determined based on software units installed on the computer;
      a discrepancy detection module configured to:
         detect a discrepancy between the expected file system state described in the template and an actual file system state of the computer, and
         responsive to an installation program attempting to add a file to the file system of the computer, detect prior to addition of the file to the file system in real time a discrepancy between the expected file system state described in the template and a file system state that would result if the installation program were permitted to add the file to the file system; and
      a discrepancy response module configured to perform an action in response to detection of a discrepancy by the discrepancy detection module.

2. The computer of claim 1, wherein the template comprises a set of entries describing files expected to exist in the file system, each entry corresponding to a file and describing a name of the file and a path of the file.

3. The computer of claim 2, wherein an entry of the template further comprises a signature describing contents of the file to which the entry corresponds.

4. The computer of claim 1, further comprising:
   a template update module configured to determine the software units installed on the computer and to update the template responsive to detection of a new software unit not reflected in the template.

5. The computer of claim 1, wherein the discrepancy detection module is configured to detect a discrepancy by comparing information associated with a file located in the file system to corresponding information about the file contained in the template.

6. The computer of claim 1, wherein the action comprises performing a malware scan of one or more files associated with the discrepancy.

7. The computer of claim 1, wherein the action comprises identifying an application associated with the discrepancy and reducing privileges of the application.

8. The computer of claim 1, wherein the action comprises issuing an alert to a user of the computer.

9. A computer-implemented method of responding to discrepancies in a file system of a computer, comprising:
   receiving a template describing an expected file system state of the computer, the expected file system state determined based on a set of software units installed on the computer;
   detecting a discrepancy, wherein the discrepancy is detected based on a comparison of the expected file system state described in the template and an actual file system state of the computer;
   responsive to an installation program attempting to add a file to the file system of the computer, detecting prior to addition of the file to the file system in real time a discrepancy based on a comparison of the expected file system state described in the template and a file system state that would result if the installation program were permitted to add the file to the file system; and
   responsive to detection of a discrepancy, performing an action.

10. The method of claim 9, wherein the template comprises a set of entries describing files expected to exist in the file system, each entry corresponding to a file and describing a name of the file and a path of the file.

11. The method of claim 10, wherein an entry of the template further comprises a signature describing contents of the file to which the entry corresponds.

12. The method of claim 9, further comprising determining the software units installed on the computer and to update the template responsive to detection of a new software unit not reflected in the template.

13. The method of claim 9, wherein the discrepancy is detected by comparing information associated with a file located in the file system to corresponding information about the file contained in the template.

14. The method of claim 9, wherein the discrepancy is between information associated with a file located in the file system and corresponding information about the file, the information associated with the file being contained in the template.

15. The method of claim 9, wherein the action comprises identifying an application associated with the discrepancy and reducing privileges of the application.

16. The method of claim 9, further comprising:
   determining the software units installed on the computer; and
   responsive to detection within the determined software units of a new software unit not reflected in the template, updating the template.

17. The method of claim 9, further comprising preventing the installation program from adding the file to the file system, responsive to detection of the discrepancy between the expected file system state described in the template and the file system state that would result if the installation program were permitted to add the files to the file system.

18. A computer program product having a non-transitory computer-readable storage medium storing executable computer program modules for responding to discrepancies in a file system of a computer, the modules comprising:
   a template storage module for storing a template, the template describing an expected file system state of the computer, the expected file system state determined based on software units installed on the computer;
   a discrepancy detection module configured to:
      detect a discrepancy between the expected file system state described in the template and an actual file system state of the computer, and
      responsive to an installation program attempting to add a file to the file system of the computer, detect prior to addition of the file to the file system in real time a discrepancy between the expected file system state described in the template and a file system state that would result if the installation program were permitted to add the file to the file system; and a discrepancy response module configured to perform an action in response to detection of a discrepancy by the discrepancy detection module.

19. The computer program product of claim 18, wherein the template comprises a set of entries describing files expected to exist in the file system, each entry corresponding to a file and describing a name of the file and a path of the file.

20. The computer program product of claim 19, wherein an entry of the template further comprises a signature describing contents of the file to which the entry corresponds.

* * * * *